E. WAYLAND.
GATE.

No. 192,204. Patented June 19, 1877.

UNITED STATES PATENT OFFICE.

ELI WAYLAND, OF SALISBURY, MISSOURI.

IMPROVEMENT IN GATES.

Specification forming part of Letters Patent No. 192,204, dated June 19, 1877; application filed April 2, 1877.

*To all whom it may concern:*

Be it known that I, ELI WAYLAND, of Salisbury, county of Chariton and State of Missouri, have invented a new and useful Improvement in Gates, of which the following is a specification.

Figure 1:
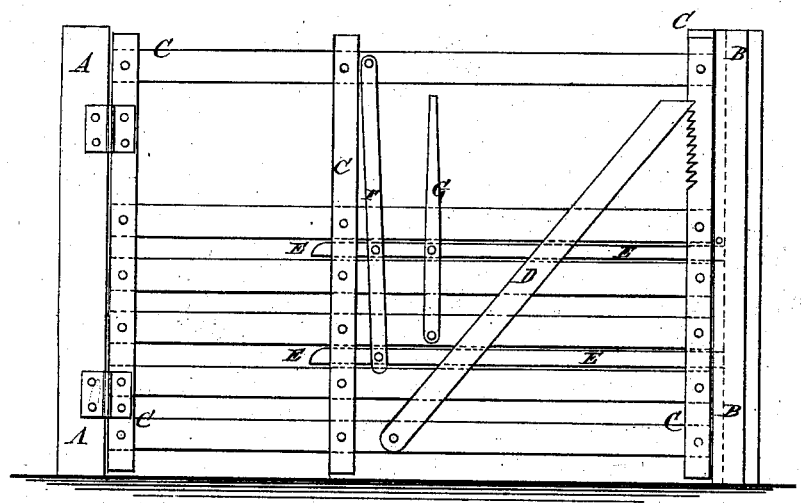
Figure 2:
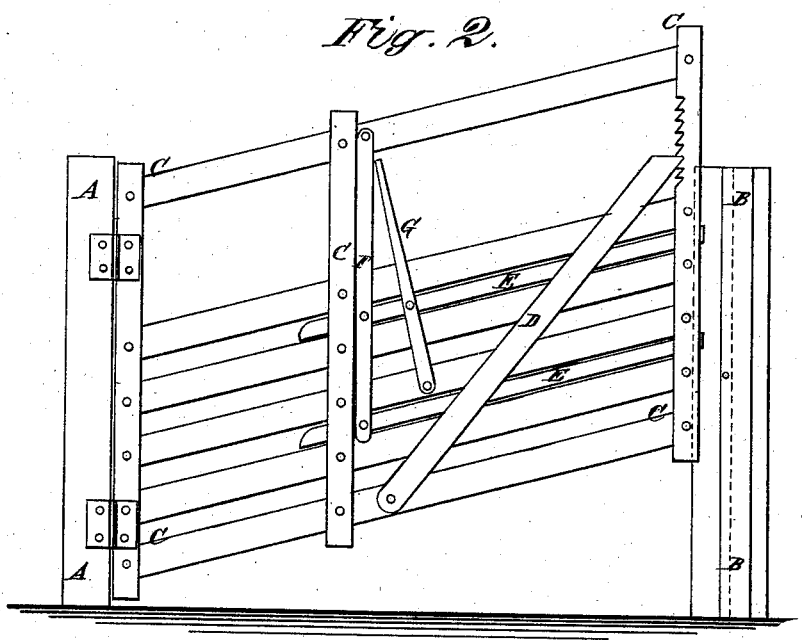

Figure 1 is a side view of my improved gate, adjusted in a horizontal position. Fig. 2 represents the gate with its forward end raised.

Similar letters of reference indicate corresponding parts.

The object of this invention is to furnish an improved gate, which shall be so constructed that its forward end may be raised and so supported that the gate may be swung open and shut, and may thus swing over snow and ice, and allow small stock to pass beneath it, while preventing the passage of large stock, and which shall be simple in construction, strong, and durable.

The invention will first be described in connection with the drawing, and then pointed out in the claim.

A is the rear post, to which the gate is hinged, and B is the forward post, against which it shuts.

C is the gate, which is formed by attaching pairs of upright bars to the opposite sides of the ends and middle parts of the horizontal bars, by means of bolts or rivets, so as to form loose or pivot joints.

The inner edge of the forward upright bars of the gate is notched to receive the beveled forward end of the brace-bar D, the rear end of which is pivoted to a lower longitudinal bar of the gate.

By this construction the loose joints allow the forward end of the gate to be raised to a greater or less height, and supported in such position by placing the beveled end of the bar D in the proper notch. The gate can then be opened and shut with the same ease as though it was in a horizontal position.

The notched part of the forward upright bars is formed by attaching three pieces of wood together, with the grain of the wood running in different directions, so that the notches will not split out.

E are two latches, which are placed and slide in the spaces between the upright and horizontal bars of the gate.

To the rear parts of the latches E is pivoted an upright bar, F, the upper end of which is pivoted to the top horizontal bar of the gate.

To the latches E is also pivoted an upright bar, G, the upper end of which projects to serve as a handle for operating the latches E. The rabbet of the post B, into which the gate shuts, has a long groove formed in it to receive the forward ends of the latches E, in whatever position the gate may be.

Having thus described my invention, I claim as new and desire to secure by Letters Patent—

The combination, with the lifting-gate C, having two latches, E E, of the bar F, swinging from a pivot on top-rail and pivoted to both the latches, thus allowing the upper latch-lever G to work both latches, as shown and described.

ELI WAYLAND.

Witnesses:
S. B. GILLELAND,
Jo. R. ROBERTSON.